US012806826B2

(12) United States Patent
Blom-Schieber

(10) Patent No.: US 12,806,826 B2
(45) Date of Patent: Nov. 24, 2026

(54) THERMOPLASTIC OVER-MOLDING SYSTEMS AND METHODS

(71) Applicant: THE BOEING COMPANY, Arlington, VA (US)

(72) Inventor: Adriana Willempje Blom-Schieber, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 70 days.

(21) Appl. No.: 18/782,162

(22) Filed: Jul. 24, 2024

(65) Prior Publication Data

US 2026/0027758 A1 Jan. 29, 2026

(51) Int. Cl.

*B29C 45/00* (2006.01)
*B29C 45/14* (2006.01)
*B29K 71/00* (2006.01)
*B29K 79/00* (2006.01)

(52) U.S. Cl.

CPC .......... *B29C 45/0001* (2013.01); *B29C 45/14* (2013.01); *B29K 2071/00* (2013.01); *B29K 2079/085* (2013.01); *B29K 2995/0012* (2013.01)

(58) Field of Classification Search

CPC . B29C 45/0001; B29C 45/14; B29K 2071/00; B29K 2079/085; B29K 2995/0012
USPC .......................................................... 264/259
See application file for complete search history.

(56) References Cited

U.S. PATENT DOCUMENTS 11,952,099 B2 4/2024 Blom-Schieber
2018/0354604 A1 12/2018 Airkawa
2019/0329464 A1 10/2019 Ikeda
2023/0399113 A1 12/2023 Davis

FOREIGN PATENT DOCUMENTS

| | | |
|---|---|---|
| CA | 2392822 | 1/2004 |
| EP | 4122686 | 1/2023 |
| EP | 4215349 | 7/2023 |
| EP | 4289609 | 12/2023 |
| KR | 100549211 | 2/2006 |
| WO | WO 2017/072007 | 5/2017 |

OTHER PUBLICATIONS

EP 25170664.4-1014, dated Oct. 21, 2025.
U.S. Appl. No. 18/177,699, filed Mar. 2, 2023.
U.S. Appl. No. 18/444,466, filed Feb. 16, 2024.

*Primary Examiner* — Christina A Johnson
*Assistant Examiner* — Xue H Liu
(74) *Attorney, Agent, or Firm* — Joseph M. Butscher; Carroll, Hoette & Butscher, LLC

(57) ABSTRACT

A method includes providing a structure including a base and a surface having different melting points. The surface has a first melting point. A compound in molten form is over-molded onto the surface. The compound has a second melting point that is greater than the first melting point. The surface is melted to secure the surface to the compound.

20 Claims, 3 Drawing Sheets

THERMOPLASTIC OVER-MOLDING SYSTEMS AND METHODS

FIELD OF THE DISCLOSURE

Examples of the present disclosure generally relate to thermoplastic over-molding systems and methods, and more particularly to systems and methods for forming thermoplastic fiber-reinforced composite parts.

BACKGROUND OF THE DISCLOSURE

Certain components are formed through an over-molding process. For example, a structure can be over-molded onto a thermoplastic substrate. However, the process of forming such a component may not provide a desirable bond between the structure and the thermoplastic substrate.

SUMMARY OF THE DISCLOSURE

A need exists for an effective and efficient system and method for over-molding a compound to a substrate.

With that need in mind, certain examples of the present disclosure provide a method including providing a structure including a surface having a first melting point; over-molding a compound in molten form onto the surface, wherein the compound has a second melting point that is greater than the first melting point; and melting the surface to secure compound to the surface.

In at least one example, the melting includes melting the surface by the compound in the molten form. Optionally (or additionally), the method includes heating the surface to a temperature that equals or exceeds the first melting point.

In at least one example, the structure includes a film coupled to a surface of the base. The base has a third melting point that is greater than the first melting point of the surface of the structure. The temperature is greater than the first melting point but less than the third melting point.

In at least one example, providing the structure includes providing a blank (which can be reinforced with fibers) that provides a base; and coupling a film to the base, wherein the film includes the surface. The base has a third melting point that is greater than the first melting point. The blank can be a carbon-reinforced laminate. The blank can be formed of polyether ether ketone (PEEK). The blank can be formed of poly ether ketone ketone (PEKK). The film can be formed of low melt poly aryl ether ketone (PAEK). The film can be formed of polyethylenimine (PEI).

In at least one example, the film is disposed around an entirety of the base.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word “a” or “an” should be understood as not necessarily excluding the plural of the elements or steps. Further, references to “one embodiment” are not intended to be interpreted as excluding the existence of additional embodiments that also incorporate the recited features. Moreover, unless explicitly stated to the contrary, embodiments “comprising” or “having” an element or a plurality of elements having a particular condition can include additional elements not having that condition.

Figure 1:
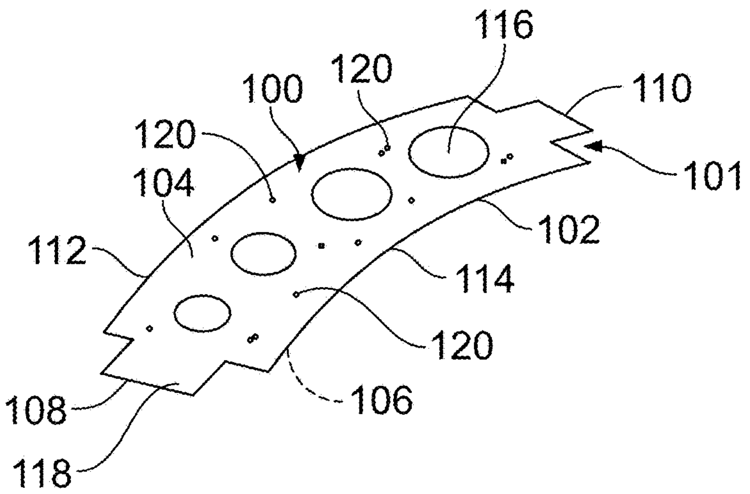
FIG. 1 illustrates a simplified view of a blank, according to an example of the present disclosure.

FIG. 1 illustrates a simplified view of a blank 100, according to an example of the present disclosure. The blank 100 can be formed as a flat panel 102. The blank 100 has a top surface 104 opposite from a bottom surface 106. The top surface 104 and the bottom surface 106 connect at ends 108 and 110, and sides 112 and 114. As shown, the blank 100 can include one or more openings 116. The blank 100 can include more or fewer openings 116 than shown. In at least one example, the blank 100 does not include any openings. The blank 100 shown in FIG. 1 is merely an example. It is to be understood that the blank 100 can be sized and shaped differently than shown.

The blank 100 is formed of a material having a melting point. In at least one example, the material is a laminate. As a further example, the material is a carbon-fiber reinforced laminate. In at least one example, the blank 100 includes a main body 118 formed of a polymer, and reinforcing fibers 120 dispersed within and throughout the main body 118. As an example, the reinforcing fibers 120 can be formed of carbon. As another example, the reinforcing fibers 120 can be formed of metal, such as aluminum. Optionally, the main body 118 may not include the reinforcing fibers.

As an example, the material is polyether ether ketone (PEEK). As an example, the melting point for the material can be 695° F. (343° C.). Optionally, the melting point for the material can be less or greater than 695° F. (343° C.).

As another example, the material is poly ether ketone ketone (PEKK). As an example, the melting point for the material can be 572-680° F. (300°-360° C.). Optionally, the melting point for the material can be less than 572° F. or greater than 680° F.

The blank 100 can be formed through a stamp forming process. Optionally, the blank 100 can be formed through cutting, milling, laser ablation, and/or the like.

Figure 2:
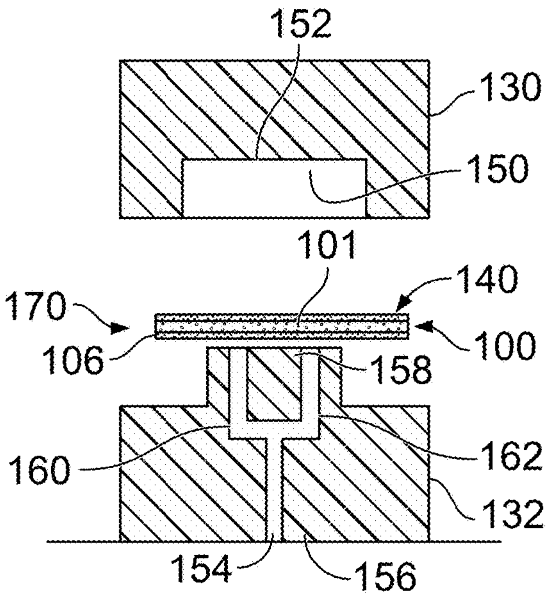
FIG. 2 illustrates a simplified front view of the blank disposed between a first die and a second die, according to an example of the present disclosure.

FIG. 2 illustrates a simplified front view of the blank 100 disposed between a first die 130 and a second die 132, according to an example of the present disclosure. Referring to FIGS. 1 and 2, the film 140 is coupled to the blank 100 as the blank 100 is being fabricated. Optionally, after the blank 100 is formed, a film 140 is coupled to the blank 100. For example, the film 140 is disposed around an entirety of the blank 100. As another example, the film 140 can be disposed only at a portion of the blank 100, such as coupled to the bottom surface 106 of the blank 100. The blank 100 provides a base 101 to which the film 140 is coupled.

The first die 130 includes a cavity 150 formed in a lower surface 152. The second die 132 includes a fluid passage 154 formed through a lower surface 156 and into and through an upper surface 158. The fluid passage 154 can include branches 160 and 162. Optionally, the fluid passage 154 can include a single straight segment. As another example, the fluid passage 154 can include one or more curved portions. The fluid passage 154 can be sized and shaped differently than shown.

In at least one example, the film 140 is bonded to base 101 (provided by the blank 100). The film 140 can be coupled to the blank 100 and heated to secure to one or more outer surfaces of the base 101.

The film 140 is formed of a material that has a lower melting point than the material of the blank 100. As an example, the material of the film 140 is low melt poly aryl ether ketone (PAEK). As an example, the melting point for the material of the film 140 can be 581° F. (305° C.). Optionally, the melting point for the material of the film 140 can be less or greater than 581° F. (305° C.).

As another example, the material of the film is polyethylenimine (PEI). As an example, the melting point for the material of the film can be 340-490° F. (171-254° C.). Optionally, the melting point for the material of the film can be less or greater than 340° F. or greater than 490° F.

In at least one example, the melting point for the material of the film 140 is at least 100° F. less than the melting point for the material of the blank 100. Optionally, the melting point for the material of the film 140 can be at least 50° F. less than the melting point for the material of the blank 100. As another example, the melting point for the material of the film 140 is at least 200° F. less than the melting point for the material of the blank 100.

The blank 100 having the film 140 coupled thereto provides a structure 170. As described, the film 140 is coupled to the blank 100.

Figure 3:
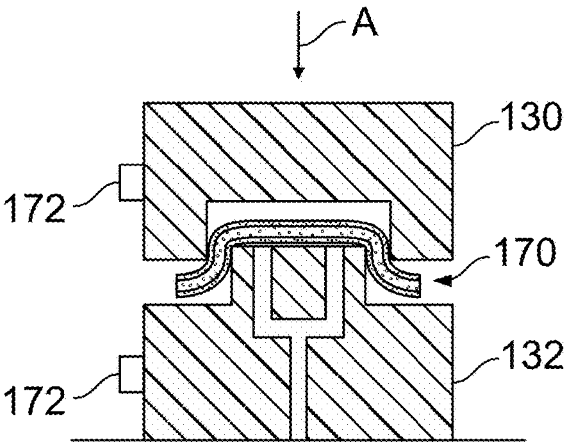
FIG. 3 illustrates a simplified front view of a first structure being formed between the first die and the second die, according to an example of the present disclosure.

FIG. 3 illustrates a simplified front view of the first structure 170 being formed between the first die 130 and the second die 132, according to an example of the present disclosure. In at least one example, prior to forming the first structure 170, the blank 100 is heated above its melting point. Such heating can be performed by suspending the blank 100 between two infrared heaters.

In at least one example, the first die 130 and the second die 132 are configured to stamp the first structure 170, such as by the first die 130 being urged in the direction of arrow A toward the second die 132, thereby providing a form to the first structure 170. The first die 130 and/or the second die 132 can be coupled to actuators, a vise, and/or the like to move the first die 130 relative to the second die 132 in the direction of arrow A.

Heaters 172 can be coupled to the first die 130 and/or the second die 132. The heaters 172 can be operated to heat the first die 130 and/or the second die 132 during the forming process to facilitate the forming process. Optionally, heaters 172 may not be coupled to the first die 130 and/or the second die 132. Optionally, instead of heaters 172, the system shown can be disposed within an oven, which can provide desired heating temperatures.

Figure 4:
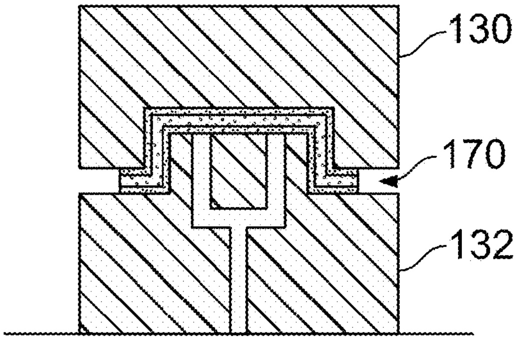
FIG. 4 illustrates a simplified front view of the first structure consolidated between the first die and the second die, according to an example of the present disclosure.

FIG. 4 illustrates a simplified front view of the first structure 170 consolidated between the first die 130 and the second die 132, according to an example of the present disclosure. Referring to FIGS. 3 and 4, the first die 130 and the second die 132 are operated to consolidate the first structure 170 into a desired shape. The shape of the first structure 170 shown in FIG. 4 is merely an example. The shape of the consolidated structure can be different than shown.

After the first structure 170 is fully formed, the first structure 170 is allowed to cool, if necessary. That is, if the forming process includes heating, the first structure 170 is allowed to cool, such as to room temperature or the glass transition temperature, but at least below the melting temperature.

Figure 5:
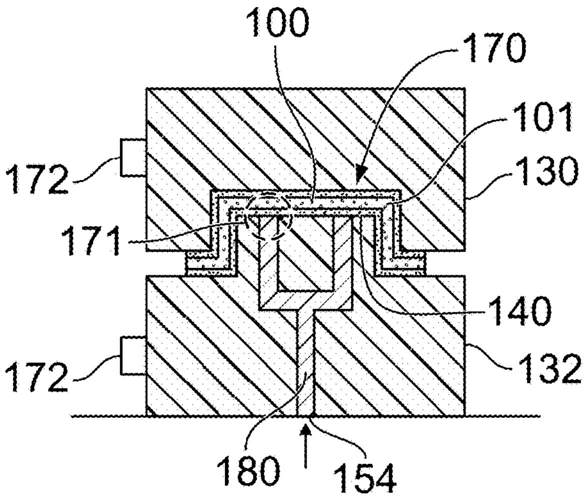
FIG. 5 illustrates a simplified front view of a compound being injection molded onto a surface of the structure, according to an example of the present disclosure.

FIG. 5 illustrates a simplified front view of a compound 180 being injection molded onto a surface of the structure 170, according to an example of the present disclosure. The compound 180 is formed of a different material than the film 140. The compound 180 is formed of a material that has a higher melting point than the melting point of the film 140. In at least one example, the compound is formed of a material having a higher melting point than the melting point of the film 140. The material of the compound 180 can have a higher melting point than the melting point of the material of the blank 100. Optionally, the compound 180 can be formed of the same material as the blank 100. As an example, the compound 180 can be formed of PEEK, and the blank 100 (which provides the base 101) can be formed of PEKK. As another example, the compound 180 and the blank 100 can both be formed of PEEK, or PEKK.

The melting point of the compound 180 is higher than the melting point of the surface 171 of the structure 170 which the compound 180 contacts during injection molding. Stated differently, the melting point of the surface 171 (formed of the film 140) is less than the melting point of the compound 180. The compound 180 is heated to a temperature that melts the compound 180, and injected into the passage 154. That is, the compound 180 is in molten form, and injected into the passage. The compound 180 in molten form flows through the passage 154 and contacts the surface 171. Because the melting point of the compound 180 is higher than the melting point of the film 140, the temperature of the molten compound 180 is necessarily higher than the melting point of the film 140. As such, as the molten compound 180 contacts the film 140, the temperature of the compound 180 locally melts the film 140 at the surface 171, thereby mingling and healing the film 140 and the compound 180 (such as resins of the compound 180). The heaters 172 can be operated to heat the film 140 to the melting temperature of the film 140 (such as to a temperature that is below the melting point of the base 101), or just below the melting temperature of the film 140. Optionally, the heaters 172 may not be used, and the temperature of the molten compound 180 provides sufficient heat to melt the film 140, thereby causing the film 140 and the compound 180 to mingle and heal. As the compound 180 cools over a period of time (such as an hour or less), the intermingled portions of the compound 180 and the film 140 securely bond together, thereby securely over-molding the compound 180 in a desired shape to the structure 170.

The compound 180 can be in molten form (and/or the heaters 172 can be operated to melt the film 140) for a predetermined period of time to provide for a sufficient bond between the compound 180 and the surface 171. The predetermined period of time can be 5 minutes, 10 minutes, 30 minutes, or more, for example. The compound 180 can include reinforcing elements, such as beads or short fibers.

Referring to FIGS. 1-5, the film 140 is miscible with both the blank 100 and the compound 180. For example, PEI is miscible with PEKK and PEEK.

The film 140 is miscible with the compound 180, as well as the blank 100. As noted, in at least one example, the blank 100 can be a polymer. Optionally, the blank 100 can be a non-thermoplastic structure. As an example, the blank 100 can be a thermoset, and the film 140 can be a thermoplastic film bonded to the thermoset. In at least one example, the base 100 can be an epoxy, the film 140 is PEI, and the compound over-molded to the film is PEEK.

Figure 6:
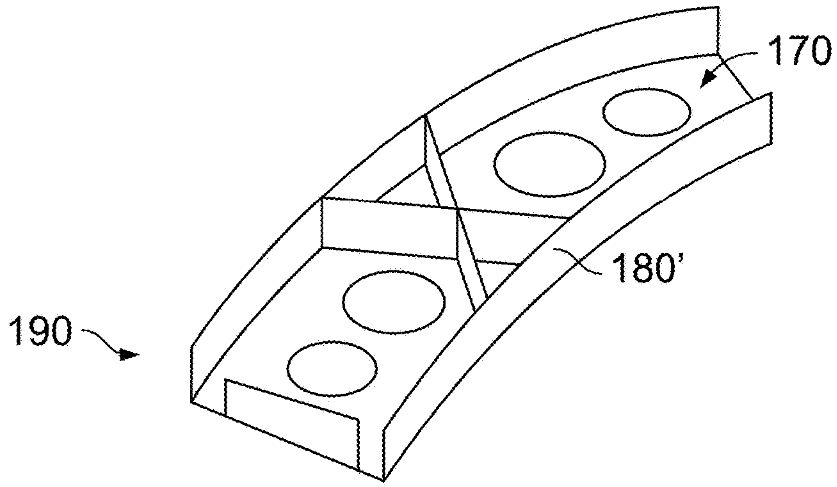
FIG. 6 illustrates a simplified view of an assembly, according to an example of the present disclosure.

FIG. 6 illustrates a simplified view of an assembly 190, according to an example of the present disclosure. The assembly 190 includes an over-molded structure 180' formed by the compound 180 (shown in FIG. 5) bonded to the structure 170.

Referring to FIGS. 1-6, examples of the present disclosure provide thermoplastic fiber-reinforced composite parts having a lower-melting, compatible thermoplastic film 140 on a surface. In a secondary step, a compatible thermoplastic injection molding compound 180 with a melt temperature equal to or higher than the film 140 is molded over the fiber-reinforced part to add reinforcing or geometric features for interfaces. The fiber-reinforced part can be made by processes such as continuous compression molding, stamp forming, oven consolidation, autoclave consolidation or any combination thereof. Examples of the present disclosure allow use of lower melting injection molding compounds, and reduce the risk of deconsolidating parent laminate.

The over-molding compound 180 has a melt temperature that is higher than the film 140, rather than the underlying laminate (for example, the blank 100 without the film 140). Accordingly, the temperature at which the fiber-reinforced part is heated is reduced, which provides improved bonding at the interface between the compound 180 and the film 140 (as it can be easier to achieve an appropriate temperature difference that helps melt the interfacing film). In addition, lower-melt materials (such as that of the film 140) typically exhibit improved viscosity (for example, increased flow), which allows for a less complex mold design. Further, the risk of deconsolidating the parent laminate is reduced, due to the temperature difference between the compound 180 and the laminate of the blank 100 being lower. Additionally, the lower-melt film 140 allows the structure 170 to be welded to other laminates, while still having the over-molded features (such as the over-molded structure 180').

Figure 7:
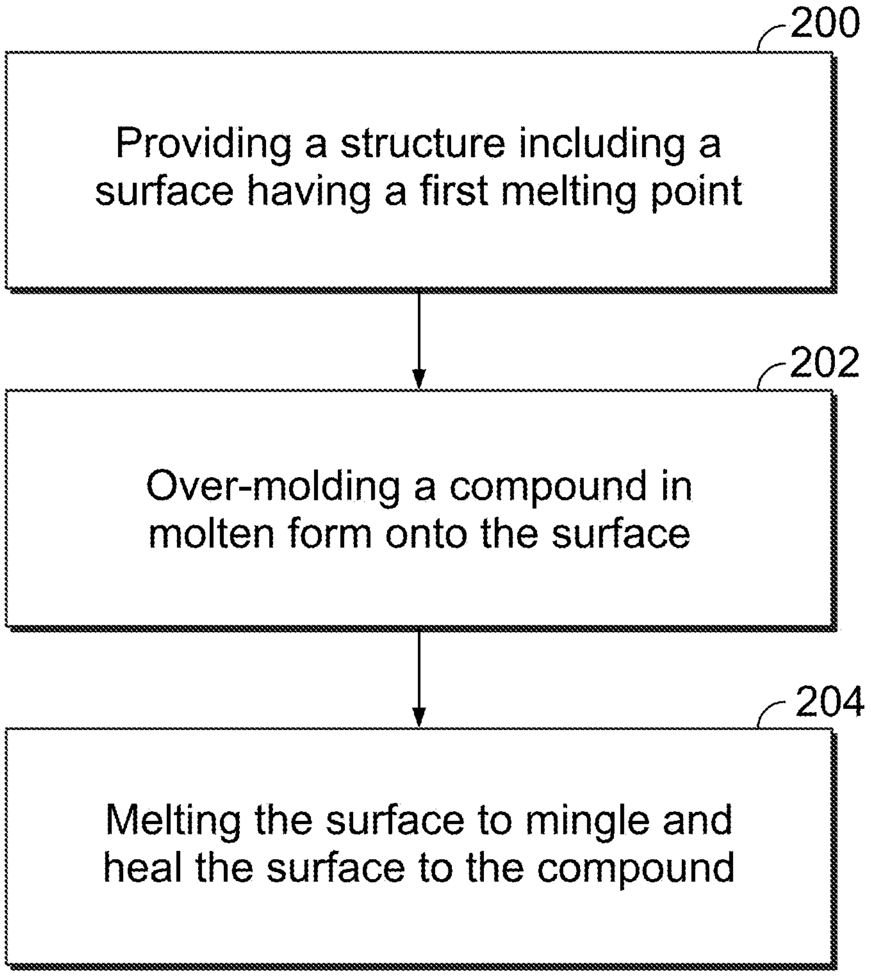
FIG. 7 illustrates a flow chart of a method, according to an example of the present disclosure.

FIG. 7 illustrates a flow chart of a method, according to an example of the present disclosure. Referring to FIGS. 1-7, at 200, the structure 170 is provided. The structure 170 includes the surface 171 having a first melting point. At 202, the compound 180 in molten form is over-molded onto the surface 171. The compound 180 has a second melting point that is greater than the first melting point. At 204, the surface 171 is melted to mingle and heal the surface 171 to the compound 180. In at least one example, the melting includes melting the surface 171 by the compound 180 in the molten form. Optionally (or additionally), the melting includes heating (such as by one or more heaters 172) the surface 171 to a temperature that equals or exceeds the first melting point. In at least one example, the structure includes the film 140 coupled to the base 101 (provided by the blank 100). The base 101 has a third melting point that is greater than the first melting point. The temperature is greater than the first melting point but less than the third melting point of the base 101 of the structure 170.

Further, the disclosure comprises examples according to the following clauses:

Clause 1. A method comprising:

providing a structure including a base and a surface having different melting points, wherein the surface has a first melting point;

over-molding a compound in molten form onto the surface, wherein the compound has a second melting point that is greater than the first melting point; and melting the surface to secure the surface to the compound.

Clause 2. The method of Clause 1, wherein said melting comprises melting the surface by the compound in the molten form.

Clause 3. The method of Clauses 1 or 2, wherein said melting comprises heating the surface to a temperature that equals or exceeds the first melting point.

Clause 4. The method of Clause 3, wherein the structure comprises a film coupled to a base, wherein the base has a third melting point that is greater than the first melting point, and wherein the temperature is greater than the first melting point but less than the third melting point.

Clause 5. The method of any of Clauses 1-4, wherein said providing the structure comprises:

providing a blank that provides a base; and coupling a film to the base, wherein the film includes the surface.

Clause 6. The method of Clause 5, wherein the base has a third melting point that is greater than the first melting point.

Clause 7. The method of Clauses 5 or 6, wherein the blank is a carbon-reinforced laminate.

Clause 8. The method of any of Clauses 5-7, wherein the blank is formed of polyether ether ketone (PEEK).

Clause 9. The method of any of Clauses 5-8, wherein the blank is formed of poly ether ketone ketone (PEKK).

Clause 10. The method of any of Clauses 5-9, wherein the film is formed of low melt poly aryl ether ketone (PAEK).

Clause 11. The method of any of Clauses 5-10, wherein the film is formed of polyethylenimine (PEI).

Clause 12. The method of any of Clauses 5-11, wherein said coupling comprises disposing the film around an entirety of the base.

Clause 13. The method of any of Clauses 1-4, wherein an entirety of the surface has the first melting point.

Clause 14. A method comprising:

providing a blank that provides a base;

coupling a film to the base, wherein the film includes a surface having a first melting point that differs from a melting point of the base;

over-molding a compound in molten form onto the surface, wherein the compound has a second melting point that is greater than the first melting point; and melting the surface to secure the surface to the compound.

Clause 15. The method of Clause 14, wherein said melting comprises melting the surface by the compound in the molten form.

Clause 16. The method of Clauses 14 or 15, wherein said melting comprises heating the surface to a temperature that equals or exceeds the first melting point.

Clause 17. The method of any of Clauses 14-16, wherein the base has a third melting point that is greater than the first melting point.

Clause 18. The method of any of Clauses 14-17, wherein the blank is formed of one or both of polyether ether ketone (PEEK), or poly ether ketone ketone (PEKK), wherein the film is formed of one or both of low melt poly aryl ether ketone (PAEK), or polyethylenimine (PEI), and wherein the compound is formed of one or both of PEEK or PEKK.

Clause 19. The method of any of Clauses 14-18, wherein said coupling comprises disposing the film around an entirety of the base.

Clause 20. A method comprising:

providing a blank that provides a base, wherein the blank has a first melting point, wherein the blank is formed of one or both of polyether ether ketone (PEEK), or poly ether ketone ketone (PEKK);

coupling a film to the base; wherein the film has a second melting point that is less than the first melting point, wherein the film is formed of one or both of low melt poly aryl ether ketone (PAEK), or polyethylenimine (PEI);

over-molding a compound in molten form onto one or more portions of the film, wherein the compound has a third melting point that is greater than the first melting point, wherein the compound is formed of one or both of PEEK or PEKK; and melting the surface to secure the surface to the compound, wherein said melting comprises melting the one or more portions of the film by the compound in the molten form, and heating the one or more portions of the film to a temperature that equals or exceeds the first melting point.

As described herein, examples of the present disclosure provide effective and efficient systems and methods for over-molding a compound to a substrate.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

providing a structure including a blank and a film having different melting points, wherein the blank is directly coupled to the film, wherein the blank includes a first polymer, wherein the film includes a second polymer that differs from the first polymer, wherein the film has a first melting point, and wherein the blank has a second melting point that is greater than the first melting point;

over-molding a compound in molten form onto the film, wherein the compound has a third melting point that is greater than the first melting point; and melting the film to secure the film to the compound.

2. The method of claim 1, wherein said melting comprises melting the film by the compound in the molten form.

3. The method of claim 1, wherein said melting comprises heating the film to a temperature that equals or exceeds the first melting point.

4. The method of claim 3, wherein the temperature is greater than the first melting point but less than the second melting point.

5. The method of claim 1, wherein the blank is a carbon-reinforced laminate.

6. The method of claim 1, wherein the blank is formed of polyether ether ketone (PEEK).

7. The method of claim 1, wherein the blank is formed of poly ether ketone ketone (PEKK).

8. The method of claim 1, wherein the film is formed of low melt poly aryl ether ketone (PAEK).

9. The method of claim 1, wherein the film is formed of polyethylenimine (PEI).

10. The method of claim 1, wherein the film is disposed around an entirety of the blank.

11. The method of claim 1, wherein an entirety of the film has the first melting point.

12. The method of claim 1, wherein the structure is devoid of any structure between the blank and the film.

13. The method of claim 12, wherein the blank is directly coupled to the film before, during, and after said over-molding.

14. A method comprising:

providing a blank that provides a base, wherein the blank includes a first polymer;

directly coupling a film to the base, wherein the film includes a second polymer that differs from the first polymer, wherein the film includes a surface having a first melting point that differs from a second melting point of the base;

over-molding a compound in molten form onto the surface, wherein the compound has a third melting point that is greater than the first melting point; and melting the surface to secure the surface to the compound.

15. The method of claim 14, wherein said melting comprises melting the surface by the compound in the molten form.

16. The method of claim 14, wherein said melting comprises heating the surface to a temperature that equals or exceeds the first melting point.

17. The method of claim 14, wherein the blank is formed of one or both of polyether ether ketone (PEEK), or poly ether ketone ketone (PEKK), wherein the film is formed of one or both of low melt poly aryl ether ketone (PAEK), or polyethylenimine (PEI), and wherein the compound is formed of one or both of PEEK or PEKK.

18. The method of claim 14, wherein said directly coupling comprises disposing the film around an entirety of the base.

19. The method of claim 14, devoid of any structure between the blank and the film, and wherein the blank is directly coupled to the film before, during, and after said over-molding.

20. A method comprising:

providing a blank that provides a base, wherein the blank has a first melting point, wherein the blank is formed of one or both of polyether ether ketone (PEEK), or poly ether ketone ketone (PEKK);

directly coupling a film to the base; wherein the film has a second melting point that is less than the first melting point, wherein the film is formed of one or both of low melt poly aryl ether ketone (PAEK), or polyethylenimine (PEI);

over-molding a compound in molten form onto one or more portions of the film, wherein the compound has a third melting point that is greater than the first melting point, wherein the compound is formed of one or both of PEEK or PEKK; and melting the surface to secure the surface to the compound, wherein said melting comprises melting the one or more portions of the film by the compound in the molten form, and heating the one or more portions of the film to a temperature that equals or exceeds the first melting point.

* * * * *